INVENTOR.
CECIL S. WISE
BY
Cushman, Darby & Cushman
ATTORNEYS

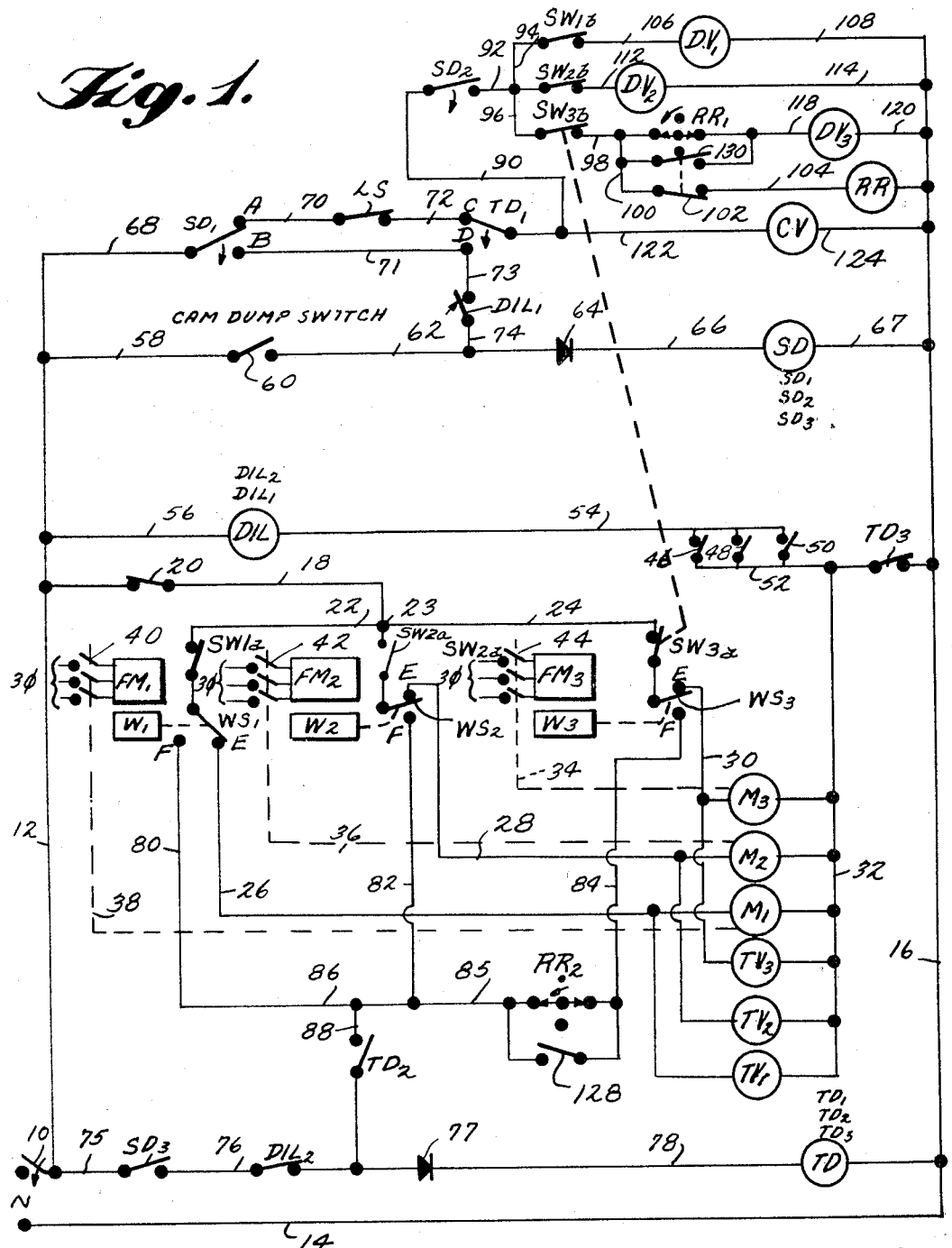

United States Patent Office 3,439,838
Patented Apr. 22, 1969

3,439,838
FIBER BLENDING EQUIPMENT
Cecil S. Wise, Dallas, N.C., assignor to Fiber Controls Corporation, Gastonia, N.C., a corporation of North Carolina
Filed Jan. 12, 1967, Ser. No. 608,908
Int. Cl. B65b 37/18
U.S. Cl. 222—57    32 Claims

ABSTRACT OF THE DISCLOSURE

This invention relates to equipment for mixing or blending materials, especially textile fibers. More particularly, this invention allows a number of different materials to be dispensed from collecting and weighing apparatus in a predetermined ratio even though one or more of the weighing equipments cannot actually weigh the small amount of material desired to be discharged thereby during a cycle of operation. That particular equipment therefore collects N times the desired amount of its material and discharges it every Nth cycle, while the rest of the collecting and weighing means weigh out and discharge their respective contents each cycle onto a moving conveyor with a 1/Nth overlap of their respective contents discharged the last cycle.

Background description and prior art

The textile industry is already familiar with blending line equipment of the type that forms a continuous fiber sandwich on a moving conveyor, such as disclosed and claimed in the Lytton et al. Patent Re. 25,609, and the Wise et al. Patent No. 3,225,848. Such equipment has been used for many years now to sandwich blend various types of textile fibers, both synthetic and natural, i.e., to mix synthetic and natural fibers, as well as to mix different synthetic fibers or different natural fibers. Many times, if not most of the time, different bales of fibers, whether they are natural fibers or synthetic fibers, need to be mixed by such blending equipment in order to give them uniformity. Most synthetic fiber manufacturers and balers of natural fibers recommend mixing different bales of the same type of fibers, since greater uniformity in the product can thereby be obtained. Generally speaking, sandwich blending is effected to prevent streaks or the like in the yarn and fabrics manufactured therefrom.

Although blending line equipment of the type disclosed and claimed in the above-mentioned patents has proved its worth many times over, there are specific instances when the weighing equipments thereof cannot weigh small enough amounts of particular fibers for the more recent blends desired. That is, in recent times, yarn and fabric manufacturers have been faced with the necessity of adding to blends some very small amounts of different materials. Before this invention, the equipment available to blend textile fibers would normally weigh amounts no smaller than about four ounces, for example. But it became necessary to have blends of different materials wherein a given material weight of, say, three ounces per cycle was desired, while the other weighing equipments produced much larger weights in order to keep the desired ratio correct.

Brief summary of the invention

This invention obviates that problem by modifying the weighing and discharging cycles of those weighing equipments that are to handle the smaller amounts, without modifying the weighing equipments themselves, i.e., their weighing capacity.

Continuing with the example above set forth wherein it is desired to weigh three ounces of a given material each cycle by one of the weighing equipment while the other weighing equipments weigh out larger amounts, the present invention provides for that one equipment to weigh N times the three ounces, for example twice that amount, which is within the capability of that weighing equipment; and then that weighing equipment is caused to discharge its contents only once every Nth cycle, i.e., every other cycle in keeping with N equals 2. In addition, in order to make the blend more uniform, the discharge from each of the other weighing equipments is caused to overlap its preceding discharge by 1/Nth its length. So in the example set forth above, successive discharges from those other equipments would be overlapped one-half their length.

In accordance with this invention, the objects thereof are to provide improvements in blending line equipment and operation thereof in keeping with the foregoing description of the invention.

The apparatus also offers an opportunity for the textile mills to select the particular weighing and collecting means which are to be delayed in their discharge, thereby increasing the efficacy of the blending operation.

A still further object of the invention is to allow complete apparatus flexibility allowing the apparatus to revert to a regular nondelay discharge.

Other objects, features and advantages of this invention will become apparent to those of ordinary skill in the art upon reading the appended claims and the following detailed description of the invention in view of the attached drawings relating to exemplary embodiments of the invention.

Brief description of drawings

FIGURE 1 displays the schematic wiring diagram for controlling the dumping or discharge operation of the subject apparatus.

Detailed description of the invention

Figure 3:
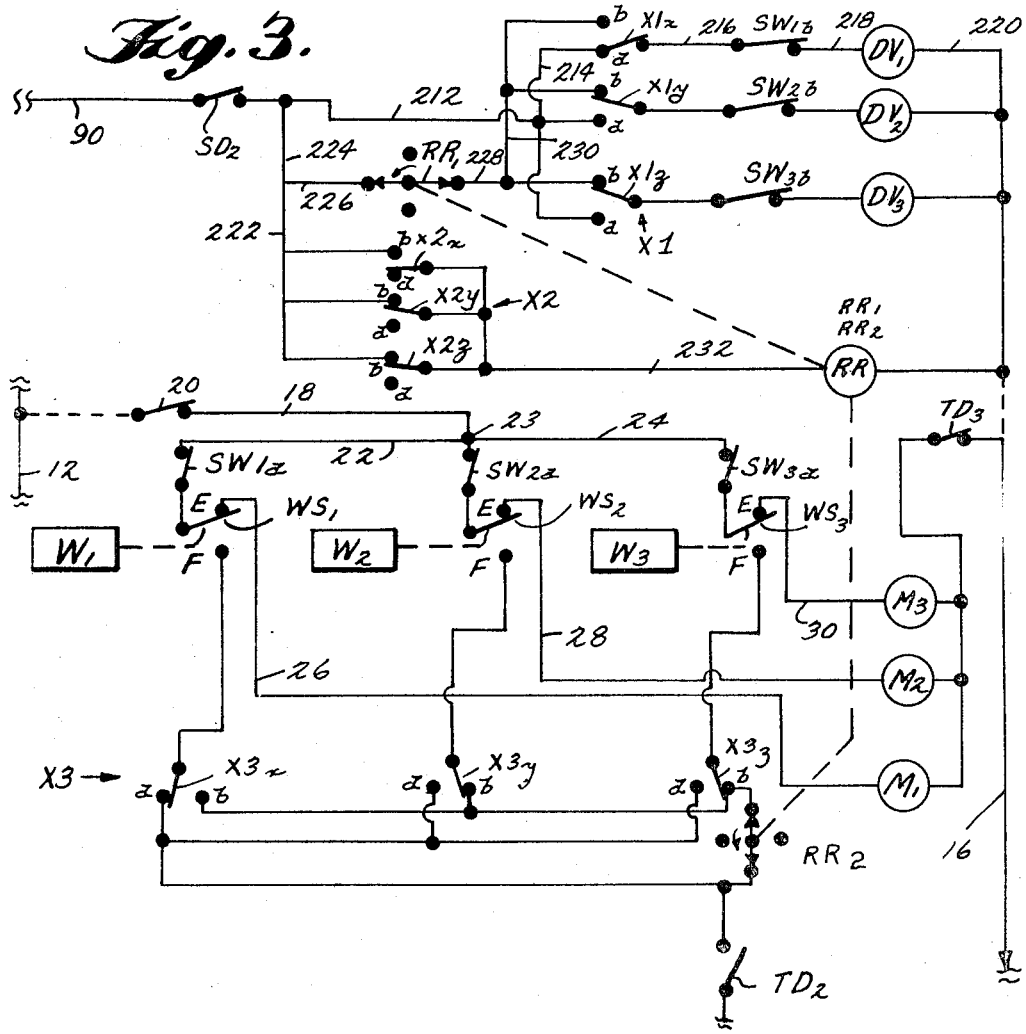
FIGURE 3 discloses an alternative embodiment of the control mechanism of the subject apparatus which allows one or more weighing means to be delayed.

In many respects, particularly those in relation to mechanical features, the equipment referred to herein may be similarly constructed to that in the above-mentioned Lytton et al. Patent Re. 25,609, and the Wise et al. Patent No. 3,225,848. Structural details of suitable feeders and weighing collecting pans along with the weighing mechanisms, may be obtained from the Lytton et al. reissue patent. As is fully explained in that patent, each feeder supplies its respective type of material into the associated weighing pans $W_1$, $W_2$ and $W_3$ when the associated starting coils $M_1$, $M_2$ and $M_3$ of the respective feed motors $FM_1$, $FM_2$ and $FM_3$ are energized. The equivalent feeding arrangement may be used with this invention.

For purposes of discussion, assume that three different fibers, such as wool, cotton and nylon, are being blended to obtain a desired fabric material. Further, assume that the desired ratio for this blend is 12.5 parts wool, 11.5 parts cotton and 1 part nylon. In keeping with this composite ratio, assume also that the desired blend shall contain twenty-five ounces of wool, and twenty-three ounces of cotton and two ounces of nylon. Assume finally that the respective weighing means $W_1$ and $W_2$ in FIGURE 1 can measure the required amounts of wool and cotton but that weighing means $W_3$ cannot measure as low as the required two ounces of nylon since it is assumed that four ounces is as low as it can measure accurately.

Each of these weighing means includes a scale mechanism and a dischargeable hopper, as in the prior patents mentioned above. For convenience, each weighing means is referred to as collecting and weighing equipment or for short, a "weigh pan." In this example, weigh pan $W_1$ weighs the twenty-five ounces of wool and weigh pan $W_2$ weighs the twenty-three ounces of cotton. Since weigh pan $W_3$ cannot weigh as low as the desired two ounces, it is filled to N times that amount, wherein N is preferably an integer, say twice the desired amount, i.e., four ounces which it can weigh, and then weigh pan $W_3$ is discharged only every Nth cycle. When N equals two in the system of FIGURE 1, the cyclic discharge of the respective fibers is as follows. During one cycle, twenty-five ounces of wool are discharged from weigh pan $W_1$, twenty-three ounces of cotton are discharged from weigh pan $W_2$, but weigh pan $W_3$ is prevented from discharging its four ounces on this cycle. On the next cycle, weigh pan $W_1$ discharges twenty-five more ounces of wool, weigh pan $W_2$ discharges twenty-three more ounces of cotton, and weigh pan $W_3$ discharges its four ounces of nylon. In this manner the 12.5:11.5:1 ratio of the composite final fabric is achieved.

With the apparatus at rest, the weigh pans $W_1$, $W_2$ and $W_3$ are empty and are ready to commence the full operative discharge cycle for the blend. Power to activate the apparatus is turned on through the on-off switch 10. This power is used to energize all the contacts and relays of the control circuits. All the contacts shown in FIGURE 1 are in their normal position, i.e., deenergized position. Power from the power source once switch 10 is closed flows through wires 12 and 14 to their respective elements within the control circuit. As previously assumed the weigh pans $W_1$, $W_2$ and $W_3$ are empty of any fiber contents. Therefore, as shown in the drawing, the control weight switches $WS_1$, $WS_2$ and $WS_3$ are all in the empty position designated E. The other position which the weight switches $WS_1$, $WS_2$ and $WS_3$ can assume is the full position represented by the letter F in FIGURE 1. This position is, of course, assumed when the weigh pans $W_1$, $W_2$ and $W_3$ respectively, contain their predetermined amount of material.

In the control circuit power flows along line 12 when switch 10 is closed and returns through lines 16 and 14, and vice versa. Line 12 connects to line 18 through a normally closed switch 20, which allows a 100% blend but which disengages the weighing apparatus from the control circuit at any time when trouble may occur. It may be considered as a safety switch for the weighing and collecting means. From line 18 power is distributed to the three weight controlled circuits by lines 22 and 24, through junction point 23. This distribution of power is continued through normally closed selector switches $SW_{1a}$, $SW_{2a}$ and $SW_{3a}$. These selector switches are respectively paired with the selector switches $SW_{1b}$, $SW_{2b}$ and $SW_{3b}$ located on the valve dumping relays circuits $DV_1$, $DV_2$ and $DV_3$; when open they eliminate that particular weighing and discharging means from the weighing and discharge operations. These selector switches are connected together mechanically in pairs (as shown only for the $SW_3$ pair for greater clarity in the drawing). Therefore, when $SW_{1a}$ is open, $SW_{1b}$ is also open, and vice versa. The remaining selector switches $SW_{2a}$, $SW_{3a}$ will also operate in conjunction with their respective selector switches $SW_{2b}$ and $SW_{3b}$. For discussion purposes the selector switches $SW_{1a}$, $SW_{2a}$, $SW_{3a}$, $SW_{1b}$, $SW_{2b}$ and $SW_{3b}$ are all assumed to be closed, that is, all the weighing and distributing apparatus are operating for this particular discharge operation.

Power flows from lines 22, 24 through the closed selector switches $SW_{1a}$, $SW_{2a}$ and $SW_{3a}$ to the weighing switches $WS_1$, $WS_2$ and $WS_3$ respectively, which as shown in the drawing are located at the empty position E. This denotes that the weigh pans $W_1$, $W_2$ and $W_3$ are completely empty of any fibers. Power flowing through these switches $WS_1$, $WS_2$ and $WS_3$ to the E position then flows through lines 26, 28 and 30 respectively to three motor starting coils $M_1$, $M_2$ and $M_3$ associated with feed motor $FM_1$, $FM_2$ and $FM_3$ respectively. In parallel with coils $M_1$, $M_2$ and $M_3$ are three trapdoor valve controlling coils $TV_1$, $TV_2$ and $TV_3$. The operation and function of such trapdoors are fully described in the Lytton Patent No. 2,995,783 and need not be specifically described herein. These valve coils are energized concurrently with the respective feed motor coils $M_1$, $M_2$ and $M_3$, and operate the trapdoors located above the weigh pans $W_1$, $W_2$ and $W_3$ respectively. This assures that the collecting operation of the weigh pans is effectively carried out. When the coils $TV_1$, $TV_2$ and $TV_3$ are energized the controlled trapdoors are opened and the weigh pans receive material. The six coil elements $M_1$, $M_2$, $M_3$ and $TV_1$, $TV_2$ and $TV_3$ are all connected to line 32, which connects through normally closed contact $TD_3$ and line 16 back to the power source. With the power flow on lines 26, 28 and 30 the three motor coils $M_1$, $M_2$ and $M_3$ are energized and concomitantly the trapdoor coils $TV_1$, $TV_2$ and $TV_3$ are also energized. The energization of the three motor feed coils $M_1$, $M_2$, and $M_3$ closes the three pole single throw switches 40, 42 and 44, controlling the feed motors $FM_1$, $FM_2$ and $FM_3$ located above the weigh pans. The interconnection of these coils with the three switches is shown by the dashed lines 34, 36 and 38. The closing of the switches 40, 42 and 44 feeding three-phase power to the feed motors $FM_1$, $FM_2$ and $FM_3$ operates the feed motors to deliver their respective materials to the weigh pans $W_1$, $W_2$ and $W_3$.

The weigh pans $W_1$, $W_2$ and $W_3$ now receive their full load of material. As hereinbefore described weigh pan $W_1$ weighs out twenty-five ounces of wool, while weigh pan $W_2$ weighs out twenty-three ounces of cotton, and weigh pan $W_3$ weighs out four ounces of nylon. The energization of the three motor starting coils $M_1$, $M_2$ and $M_3$ which closes the respective switches 40, 42 and 44, concurrently closes holding contacts 46, 48 and 50 respectively. That is, coil $M_1$ closes switch 46, coil $M_2$ closes switch 48 and coil $M_3$ closes switch 50. The closing of any one of these three switches energizes the dump interlock relay coil DIL through line 16, contact $TD_3$ and lines 52, 54 and 56. The energization of this relay DIL is effected since the contact $TD_3$ is normally closed.

The energization of the dump interlock relay DIL closes its switch contact $DIL_1$ which is normally open, and opens the normally closed contact $DIL_2$. This closing of contact $DIL_1$ assures that the dumping circuit represented by the dump valves $DV_1$, $DV_2$ and $DV_3$ is completely deenergized, while the opening of contact $DIL_2$ deenergizes time delay relay TD and assures that no dump can be made. A circuit is established from lines 12 and 58 when cam dump switch 60 is closed by a cam (not shown) or the like such as a timer or photocell type operation. The operation of this switch by a cam on a timing chain connected to the conveyor beneath the weigh pans, is fully explained in the Wise et al. patent mentioned above, and the disclosure thereof is incorporated herein by reference. When the cam dump switch is closed, the circuit to the safe dump relay SD is energized through line 62, diode 64 and line 66. Safe dump relay SD is of the time delay type, controlling the closing and opening of contacts $SD_1$, $SD_2$ and $SD_3$ which are shown in their normal position. The contacts controlled through the safe dump relay, that is, $SD_1$, $SD_2$ and $SD_3$ are closed, if open, or shifted from one position to another instantaneously by the energization of dump relay SD. However, when the safe dump relay SD is deenergized a time delay or a lapse of time of approximately 2 to 3 second passes before the SD controlled relay contacts $SD_1$, $SD_2$ and $SD_3$ return to their normal position. The control of these various relay contact switches is not shown in dashed line configuration since the large number of relay contacts which is being controlled by the various relay coils incorporated within the control circuit would tend to produce a rather conglomerate drawing. The respective controls of each relay are shown by enumerating the relay contacts adjacent to the relay coil, which each operates.

The energization of relay coil SD shifts its relay control contacts $SD_1$, $SD_2$ and $SD_3$, respectively. $SD_1$ relay contact is shifted from position A to position B. The shifting of this relay contact $SD_1$ produces an interlocking arrangement for the relay coil SD even if the cam dump switch opens; that is, power is then transmitted to the SD relay coil through line 68, relay contact $SD_1$ in position B, line 71, line 73, closed contact $DIL_1$, line 74, diode 64 and line 66. Contact $DIL_1$ remains closed as long as the energization of coil DIL is maintained through the closing of any of the switch contacts 46, 48 and 50. These latter contact switches remain closed maintaining thereby the energization of coil DIL, as long as the weigh pans $W_1$, $W_2$ and $W_3$ are receiving their respective predetermined amount of material. The energized condition of relay coil SD is maintained until the last one of the weigh switches $WS_1$, $WS_2$ and $WS_3$ shifts from the empty position E to the full F position, indicating that all of the weigh pans have received their respective predetermined amounts of material. The shift of contact $SD_1$, from position A to position B interrupts the power to the conveyor magnetic coil CV which controls the power to the conveyor motor (not shown) thereby stopping the movement of the conveyor belt (see FIGURE 2). Simultaneous with the shifting of contact $SD_1$, from position A to position B, the normally open contacts $SD_2$ and $SD_3$, now close.

When the weigh pans $W_1$, $W_2$ and $W_3$ have measured and collected to desired amount of material, that is 25 ounces of wool, 23 ounces of cotton and four ounces of nylon, respectively, each drops down independently of the other and shifts its weight switch $WS_1$, $WS_2$ or $WS_3$ from position E to position F. This shifting of positions of the switches deenergizes the respective feed motor coils $M_1$, $M_2$ and $M_3$ terminating the feeding of the respective weigh pans. Also with the deenergization of feed motor coils $M_1$, $M_2$ and $M_3$, switch contacts 46, 48 and 50 are opened, thereby deenergizing the dump interlock relay DIL. This deenergization opens the relay contact $DIL_1$ and closes the contact $DIL_2$.

The opening of contact $DIL_1$ by the deenergization of the dump interlock relay DIL causes the safe dump relay to become deenergized, but due to its delay characteristics the relay contacts which are controlled therefrom remain in their position for two or three seconds, or whatever time delay is desired to assure the complete discharge of the weigh pans. The switch contacts $SD_3$ and $DIL_2$ are now both closed and through circuit lines 75, 76, diode 77 and line 78, the time delay relay coil TD is energized. The energization of this time delay relay activates its contacts $TD_1$, $TD_2$ and $TD_3$. Contact $TD_1$ is moved from position C to position D. Contact $TD_3$, which is normally closed, is now opened and contact $TD_2$, which is normally opened, is now closed. The closing of contact $TD_2$ assures the interlock of relay coil TD through the following circuit: line 12, normally closed switch 20, line 18, lines 22 and 24, closed selector switches $SW_{1a}$, $SW_{2a}$ and $SW_{3a}$, weight switches $WS_1$, $WS_2$ and $WS_3$ which have been shifted over the F or full position, through lines 80, 82 and 84, contact $RR_2$, lines 85, 86 and 88, the now closed contact $TD_2$ and diode 77. The $RR_2$ contact switch which is shown open is controlled by the RR stepping or ratchet relay coil and at this time it is closed. The full operation of this contact switch $RR_2$ is explained hereinafter.

As above indicated, the energization of time delay relay coil TD shifts $TD_1$ contact from the C to the D position. Since contact $SD_1$ is still at its B position due to the delay of its opening, a circuit to line 12 is now provided for the energization of the discharge or dump valve coils $DV_1$, $DV_2$ and $DV_3$, through line 68, closed switch $SD_1$ in the B position, line 71, contact $TD_1$ in the D position, line 90, closed contact $SD_2$, line 92, lines 94 and 96, and selector switches $SW_{1b}$, $SW_{2b}$ and $SW_{3b}$ which, as previously described, are closed. This operation transmits power to the dump valve coils $DV_1$ and $DV_2$, but not coil $DV_3$. That is, since relay coil RR is simultaneously energized through the closed $SW_{3b}$ switch, line 98 and line 100, normally closed contact switch 102 and line 104, relay coil RR opens its contact $RR_1$ and prevents the energization of dump valve $DV_3$. Relay RR may be of the ratchet or stepping type.

Since the material weighed in weigh pan $W_3$ is not to be dumped on this particular cycle, the ratchet or stepping relay RR keeps the contact $RR_1$ open as above explained, thereby preventing the energization of the dump valve coil $DV_3$. The other two dump valve coils $DV_1$ and $DV_2$ are energized however, and the weighed material which has been accumulated in weigh pans $W_1$ and $W_2$ is dumped upon the conveyor belt located therebelow. When the SD contacts $SD_1$, $SD_2$ and $SD_3$ return to their normal position that is the open position for $SD_2$ and $SD_3$ and position A for $SD_1$, the dump of the weigh pans $W_1$ and $W_2$ is terminated, since the dump valve coils $DV_1$ and $DV_2$ are deenergized by the opening of contact $SD_2$. Discharging of the pans $W_1$ and $W_2$ causes the weigh switches $WS_1$ and $WS_2$ to return to the E position thereby indicating that they are once again ready to be filled. However, since switch $WS_3$ remains in its F position because the accumulated four ounces of material was not discharged during this cycle, the time delay relay TD would remain in an energized condition and prevent refeeding if it were not for contact $RR_2$, which opened with the energization of relay coil RR and opened the circuit to coil TD. That is, the energization of relay coil RR which opened its contact $RR_1$ also opened its contact $RR_2$, thereby allowing time delay coil TD to become deenergized and allowing pans $W_1$ and $W_2$ to be refilled. Therefore, when weight switches $WS_1$ and $WS_2$ return to the E position, coil TD is deenergized and contact $TD_2$ is opened. Contact $TD_3$ is returned to its normal condition, that is, closed and $TD_1$ which was in position C is returned to position D. Through this operation the conveyor control coil CV is energized through a circuit composed of line 68. $SD_1$ contact in position A, line 70, closed demand switch LS, line 72, contact $TD_1$ in its C position, and line 122, completing the circuit through line 124. This commences the movement of the conveyor belt located under weigh pans $W_1$ and $W_2$, moving the discharged material until the timing chain (not shown) by which the cam dump switch 60 is controlled closes the cam dump switch 60 once again.

The apparatus is now in a condition to receive further material in its weigh pans $W_1$ and $W_2$. Since weigh pan $W_3$ was not discharged in the previous cycle, it still contains the dischargeable amount of four ounces of nylon that is to be discharged on this next cycle to obtain the proper ratios for the blended material. The apparatus is recycled to fill the weigh pans $W_1$ and $W_2$ with their respective amounts of material, that is, 25 ounces of wool in $W_1$ and twenty-three ounces of cotton in $W_2$. This is carried out by the energization of the feed motor coils $M_1$ and $M_2$ through the circuit of line 12, normally closed switch 20, line 18, line 22 through the selection switches $SW_{1a}$, $SW_{2a}$, weight switches $WS_1$, $WS_2$ through lines 26 and 28 from the empty position E of $WS_1$ and $WS_2$, energizing thereby the feed motor coils $M_1$ and $M_2$ through line 32. The respective contact switches 46 and 48 are closed and the dump interlock relay DIL is reenergized through lines 56 and 54 closed contacts 46 and 48, line 52 and the normally closed contact switch $TD_3$.

The reenergization of dump interlock relay DIL closes contact $DIL_1$ and opens contact $DIL_2$ thereby assuring that no dump can be effected while the weigh pans $W_1$ and $W_2$ are being filled with their respective amount of material. When the conveyor belt is in its proper position below the discharging weigh pans $W_1$, $W_2$ and $W_3$, determined by the timing chain (not shown) which closes the cam dump switch 60, thereby energizing the safe dump relay coil SD, the discharge cycle for all the weigh pans $W_1$, $W_2$ and $W_3$ is commenced.

The energization of the safe dump relay coil SD once again transfers its contacts $SD_1$, $SD_2$ and $SD_3$ from their normal (illustrated) position. Contacts $SD_2$ and $SD_3$ are closed and contact $SD_1$ is shifted from position A to position B. This shifting deenergizes the conveyor coil CV and stops the conveyor belt from continuing further until after the discharge of the material has been effected. The SD relay coil is interlocked once again through contact $DIL_1$ and the circuit composed of line 68, contact $SD_1$ in its B position, lines 71, 73, and 74, diode 64 and line 66, completing the cricuit via line 67. The DIL relay is deenergized by the shifting of the weight switches $WS_1$ and $WS_2$ from their empty position to the full position designated by F. This deenergizes the motor coils $M_1$ and $M_2$ and opens the three phase line switches 40 and 42, thereby terminating the feeding of material to weigh pans $W_1$ and $W_2$. The deenergization of dump interlock relay DIL opens the contact $DIL_1$ and allows $DIL_2$ to close since this is its normal position. The apparatus is now ready to discharge its accumulated weight in $W_1$, $W_2$ and $W_3$ upon the energization of the dump valve coils $DV_1$, $DV_2$ and $DV_3$ through the circuit composed of line 68, $SD_1$ contact in position B, line 71, the shifted contact $TD_1$ in its position D, line 90, closed contact $SD_2$, lines 92, 94 and 96, and the closed selector switches $SW_{1b}$, $SW_{2b}$ and $SW_{3b}$. Dump valve coils $DV_1$ and $DV_2$ and relay RR are energized as previously. However, on this particular cycle the energization of the ratchet or stepping relay RR causes the contact $RR_1$ to close thereby energizing dump valve coil $DV_3$ through lines 98, 116, closed contact $RR_1$, line 118 and line 120. The energization of the dump valve $DV_3$ causes weigh pan $W_3$ to dump the accumulated four ounces of nylon simultaneously with the dumping of the respective materials from weigh pans $W_1$ and $W_2$.

With the dumping of all three weigh pans $W_1$, $W_2$ and $W_3$ the weight switches $WS_1$, $WS_2$ and $WS_3$ return to the empty E position, so that weigh pans $W_1$, $W_2$ and $W_3$ are ready once again to be filled with their respective supply of material. The returning of the switches to the E terminal of the circuit opens (after a given time delay) the interlock by contact $TD_2$, since the power from line 12 is transferred from the F terminal to the E terminal thereby allowing the apparatus to again obtain a definite predetermined amount of material in each weigh pan. The operation of the weigh pans in this manner is repeated as many times as it is desired.

The contacts $RR_1$ and $RR_2$ being operated through the stepping or ratchet relay coil RR allow the apparatus to prepare blends of material having relative ratios requiring cyclic weights which may be too small to be weighed by the weigh pan to be weighed N times and dumped every Nth cycle, thereby allowing a homogeneous mixture to be prepared. It is understood that in the practice of this invention that this delay of discharge can be extended to operate every three, four, five or any number of cycles N; that is, one (any one or more if desired, as described below) of the weigh pans, such as $W_3$, may be prevented from discharging except on every Nth cycle, if desired.

When it is desired to operate the apparatus without the delay function, switch 130 across contact $RR_1$ is closed, thereby allowing the dump coil valve $DV_3$ to become energized and discharge weigh pan $W_3$ every cycle with the discharge of weigh pans $W_1$ and $W_2$. Therefore, weigh pan $W_3$ can dump its contents each time that its predetermined amount is accumulated. Switch 130 operates in opposition to and is mechanically linked to switch 102, thereby causing switch 102 to open and prevent energization of relay RR when switch 130 is closed. A similar switch contact 128 is placed parallel to contact $RR_2$, and is preferably also mechanically linked to switch 130 to open and close therewith. These parallel contacts 128 and 130 obviate the situation where relay coil RR is deenergized with its contacts $RR_1$ and $RR_2$ in an open position, thereby preventing completion of the two required circuit paths for change over to regular dumping, that is, without the delay of one weigh pan. Switches 128 and 130 also fulfill another requirement, that is to take care of the situation of the system being shut down in a condition which finds both $RR_1$ and $RR_2$ open, but it is desired to dump the contents which may remain in weigh pan $W_3$ in one particular commencing cycle. The dump valve $DV_3$ is energized directly through contact switch 130 and a circuit is established to contact $TD_2$ through line 84 and closed contact 128 even though $RR_2$ is open. Switch 102 is mechanically operable in opposition to contacts 128 and 130, that is when 102 is closed contacts 128 and 130 are open and when 102 is open, contacts 128 and 130 are closed.

Figure 2:
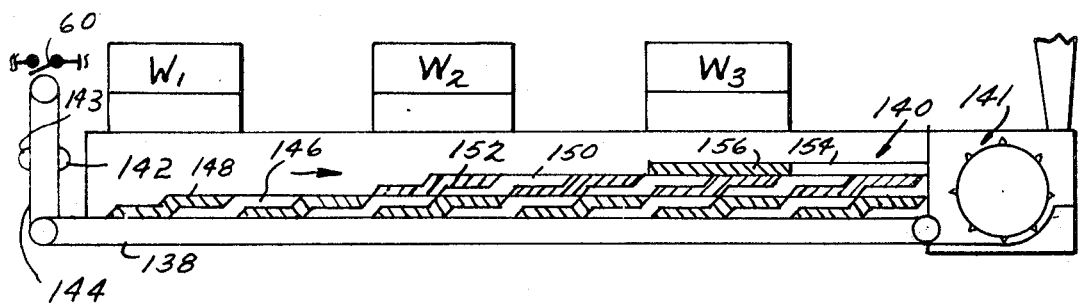
FIGURE 2 discloses the sandwiching of the fiber resulting from the controlled delay dumping operation of the subject invention.

In FIGURE 2 there is shown a conveyor belt 138 which has received the discharged material from the three FIGURE 1 weigh pans $W_1$, $W_2$ and $W_3$ to form a sandwich 140. The overlapping of the discharged material as shown in FIGURE 2 is achieved by the control apparatus shown in FIGURE 1, that is, by allowing weigh pan $W_3$ to discharge only on every other cycle; in conjunction with dumping weigh pans $W_1$ and $W_2$ each time conveyor 138 has moved their last prior discharge one-half their length downstream. This is accompilshed, for example, by using two cams 142 and 143 on timing chain 144, or by using just one such cam on a chain half the length. The former is preferable since then it is easy just to remove one cam when it is desired to operate the equipment with the FIGURE 1 switches 128 and 130 closed so as to effect end to end dumping by all pans. With the overlap dumping of FIGURE 2, the resulting sandwich 140 presents to blender 141 a continuous cross section of the three materials in their correct proportions by weight.

It will be noted in FIGURE 2 that the first two weigh pans $W_1$ and $W_2$ discharge their weighed out contents each time one of the cams 140, 142 closes the dump switch 60, forming successive one-half overlapped layers 146 and 148 from pan $W_1$ and layers 150 and 152 from pan $W_2$. The third weigh pan $W_3$ discharges its contents, however, only on every alternate cycle to form flat layers 154 and 156. If rather than being discharged every other dump cycle, weigh pan $W_3$ discharges every third cycle and the weigh pans $W_1$ and $W_2$ discharge their contents each time they weigh out and dump switch 60 is closed, an overlap of one-third is achieved. Similarly, if pan $W_3$ is discharged every Nth cycle, the discharge from weigh pans $W_1$ and $W_2$ is overlapped 1/N their length.

While the weigh pans $W_1$, $W_2$ and $W_3$ are spaced apart the same length as their discharge, such is not essential to this invention. In fact, they may be spaced apart any desired distance, equally or unequally, and no spacing distance needs to be equal to or a multiple or submultiple of the length of any of the weigh pans, which may be of unequal length if desired. In addition, as will become more apparent from the FIGURE 3 description, it need not be weigh pan $W_3$ that discharges only once every Nth cycle, but instead it may be any other weigh pan in the blending line regardless of its location. Of course, the number of weigh pans in the line need not be three, but may be any number two or greater.

The partial circuit in FIGURE 3 discloses an alternative embodiment of the control mechanism of the subject apparatus, allowing a flexible feature to be incorporated therein; that is, it allows any desired one of the three (or more) weigh pans to be discharged only every Nth cycle. In addition, it allows more than one such weigh pan to be so discharged. The circuit in this particular embodiment includes three triple pole, double-throw switches allowing a selection to be made of which one or more of the weigh pans is or are discharged only once every Nth cycle.

Only the closely connected portions of the FIGURE 1 circuit are reproduced in FIGURE 3. The numbering of FIGURE 3 is similar to the numbering of FIGURE 1 so that a correlation can be readily made. Power line 12 as shown feeds power to switch 20, which is normally closed, and also to line 90 in the manner previously explained. Line 16 forms the other power line, as before.

In order to obtain the selectivity of the particular discharge of the weighing pans $W_1$, $W_2$ and $W_3$ as desired, it is assumed in this particular example that the amounts accumulated in weigh pans $W_2$ and $W_3$ are to be delayed, i.e., discharged only every Nth cycle, while weigh pan $W_1$ is to discharge every time that it accumulates the desired weight each cycle. The three sets of selectivity switches are designated X1, X2 and X3 and each set contains three switches further designated $x$, $y$ and $z$, respectively. These switches are manually operable and are preferably gauged so that X1$x$, X2$x$ and X3$x$ operate together, X1$y$, X2$y$ and X3$y$ operate together, and X1$z$, X2$z$ and X3$z$ operate together.

As an example, FIGURE 3 shows the contacts of switches X1, X2 and X3 are placed in the position which allows weigh pans $W_2$ and $W_3$ to dump only once every Nth cycle, e.g., every other dump time while weigh pan $W_1$ discharges every cycle. Therefore, the contacts of switch sets X1, X2 and X3 are set in the following manner: the contacts of selection switch X1 are placed in position $a$ for X1$x$ and position $b$ for X1$y$ and X1$z$; the contacts of selection switch X2 are also placed in the same position, that is, position $a$ for X2$x$ and position $b$ for X2$y$ and X2$z$. While the contacts of selection switch X3 are also placed in the same position, that is X3$x$ is in position $a$, X3$y$ is in position $b$ as is also X3$z$ in position $b$. With this arrangement weigh pans $W_2$ and $W_3$ discharge only on every other cycle. The respective contacts of each selection switch are preferably mechanically linked to one another; therefore, when contact X1$x$ is in position $a$, contact X2$x$ and contact X3$x$ are also in position $a$, etc.

An alternating cycle discharge for weigh pans $W_2$ and $W_3$, i.e., discharge every second cycle, is assumed only for clarity. It is understood, of course, that if a stepping relay of three or more positions were used in place of a two step or ratchet relay coil RR, then an alternating discharge every third or more cycle can readily be achieved.

Starting with all the weigh pans $W_1$, $W_2$ and $W_3$ empty and the discharge control circuit deenergized, on-off switch 10 is closed, thereby energizing line 12, line 18 through closed switch 20. The feed motor coils $M_1$, $M_2$ and $M_3$ are concurrently energized through circuit lines 22 and 24, normally closed selector switchs $SW_{1a}$, $SW_{2a}$ and $SW_{3a}$, and the weight switches $WS_1$, $WS_2$ and $WS_3$ which are in the empty E position, thereby transmitting power through lines 26, 28 and 30 to the motor feed coils $M_1$, $M_2$ and $M_3$. This operation closes the same contacts as in FIGURE 1, that is, contacts 46, 48 and 50, energizing the dump interlock relay DIL which interlocks the safe dump relay coil SD (not shown here but see FIGURE 1) and presents the circuit for the dump cycle once the weigh pans $W_1$, $W_2$ and $W_3$ have received their accumulated weight. When the weigh pans $W_1$, $W_2$ and $W_3$ have received their predetermined amount of material, the weight switches $WS_1$, $WS_2$ and $WS_3$ shift from the empty position E to the full position F, thereby de-energizing the feed motor coils $M_1$, $M_2$ and $M_3$ and de-energizing concomitantly the dump interlock relay DIL (as described previously for the circuit in FIGURE 1).

As described in relation to FIGURE 1 $SD_2$ contact in FIGURE 3 remains closed to effect dumping by energizing the dump valve coils DV. When power is on line 90, contact $SD_2$ transmits current from line 90 through the closed contact $SD_2$ to line 212, to line 214, through position $a$ of contact X1$x$ to line 216, normally closed selector switch $SW_{1b}$, and line 218, thereby energizing the dump valve coil $DV_1$ by completion of the circuit through line 220 to line 16. This energization causes weigh pan $W_1$ to dump its accumulated contents. But since the contacts X1$y$ and X1$z$ are in position $b$, contacts X2$y$ and X2$z$ are also in position $b$ and current flows between lines 222 and 232 to energize relay coil RR, thereby maintaining the $RR_1$ contact in an open condition. The dump valve coils correlated to weigh pans $W_2$ and $W_3$, that is, $DV_2$ and $DV_3$, are therefore not energized and the contents of these two weigh pans $W_2$ and $W_3$ remain in the weigh pans until the next discharge cycle. The energization of the relay coil RR not only causes its contact $RR_1$ to remain open, but also opens and holds open its other contact $RR_2$ in the weight switch $WS_3$ and contact $TD_2$ circuit.

The weight switch $WS_1$ of weigh pan $W_1$, once the weigh pan is discharged of its contents, returns to the E position. However, the weight switches $SW_2$ and $SW_3$ remain in the full position F. The weigh pan $W_1$ is recharged through the reenergization of feed motor coil $M_1$, as described above with regard to FIGURE 1.

When the weigh pan $W_1$ is recharged to its desired weight, the weight switch $WS_1$ returns to the F position, thereby reenergizing dump valve coil $DV_1$ and relay coil RR. The weigh pans $W_2$ and $W_3$ on this cycle are dumped with weigh pan $W_1$ because of the closing of contact $RR_1$ upon that reenergization of relay coil RR, the power being transmitted to dump valve coils $DV_2$ and $DV_3$ through lines 224, 226, closed contact $RR_1$, lines 228, 230, and switches X1$y$ and X1$z$. The energization of dump valve coils $DV_2$ and $DV_3$ allows the contents of weigh pans $W_2$ and $W_3$ to be completely discharged simultaneously with the discharge of pan $W_1$.

With the discharge of all the weigh pans $W_1$, $W_2$ and $W_3$ the weight switches $WS_1$, $WS_2$ and $WS_3$ return to their empty positions E and the feed motor coils $M_1$, $M_2$ and $M_3$ are once again energized allowing the feed motors, $FM_1$, $FM_2$ and $FM_3$ to begin their feeding operation to once again refill their respective weigh pans. The apparatus allows all three weigh pans $W_1$, $W_2$ and $W_3$ to receive their respective material and $W_1$ will discharge while $W_2$ and $W_3$ are prevented from discharging their accumulated contents, by the same process as previously described. After $W_1$ has once again been refilled all three weigh pans $W_1$, $W_2$ and $W_3$ discharge their respective contents, and the process may be repeated ad infinitum to obtain the accurate sandwich blending desired. The selectivity of the system increases its efficacy since all weigh pans may be discharged at one time or at least one may be delayed from discharging, and in some instances as shown in FIGURE 3 two weigh pans may be delayed from discharging their contents.

While this invention as set forth in FIGURES 1–3 is useable in conveyor belt blending lines already installed in order to adapt them to situations where a quantity which cannot be measured by the existing equipment needs to be part of the blend, this invention also finds great utility in newly manufactured blending lines in order that a greater range of weights may be measured accurately. That is, while it might be easy to scale down one or more of the weighing mechanisms to handle the smaller weights contemplated, such is normally not desirable because it is done at the sacrifice of accuracy in the larger weights which the equipment may need to handle at other times.

It is therefore apparent that this invention has provided apparatus and a method of operation thereof which will accomplish all the objects and advantages and has all the features herein mentioned. It will be appreciated by one of ordinary skill in the art, after reading this disclosure, that many modifications of the exemplary embodiments described in detail above may be made without departing from the scope of the invention as defined by the appended claims.

What is claimed is:

1. Apparatus for controlling the discharge of material from collecting means wherein said discharge is dependent upon the accumulated weight of the material received by said collecting means, comprising:

a plurality of cyclicably fillable and dischargeable material collecting means, weighing means respectively associated with said collecting means for determining during filling thereof when a respective weight of material has been accumulated, one of said weighing means being incapable of weighing a desired amount of material but being capable of weighing N times that amount which is its said respective weight, and means for discharging, once each cycle, each of said collecting means except at least one every Nth cycle, said one collecting means being respectively associated with said one weighing means.

2. Apparatus as in claim 1 wherein each of said collecting, weighing and discharging means is structured to handle fibers.

3. Apparatus as in claim 2 including means for discharging said one collecting means each cycle and means operative on the said discharging means for said one collecting means for preventing operation thereof except once every Nth cycle.

4. For use with material blending equipment of the type which builds a sandwich on a moving conveyor and includes a plurality of spaced weighing and collecting means cyclically fed with a respective predetermined amount of material to be discharged onto said moving conveyor which commonly extends beneath each of the collecting means, wherein at least one of said weighing and collecting means is incapable of handling a particular amount of material but is capable of handling N times that amount of material, the improvement comprising:

means operative each cycle to discharge the said predetermined amount of material from all of said collecting means except said one weighing and collecting means, means for causing immediately successive discharges from any one of said weighing and collecting means except said one weighing and collecting means to be over-lapped by 1/Nth their length, and means for discharging said one weighing and collecting means every Nth cycle to effect on said conveyor a continuous sandwich containing material from each of said collecting means.

5. For use with an apparatus as in claim 4 including the further improvement of multiple selection means for determining which of said collecting and weighing means are to be discharged during said Nth cycle.

6. For use with an apparatus as in claim 5 wherein said multiple selection means are multiple position switches and include a stepping relay for preventing the selected collecting and weighing means from discharging until the Nth cycle.

7. For use with material blending equipment which includes a plurality of spaced weighing and collecting means cyclically fed with a respective predetermined amount of material to be discharged wherein at least one of said weighing and collecting means is incapable of handling a particular amount of material but is capable of handling N times that amount of material, the improvement comprising, means operative at each cycle to discharge the said predetermined amount of material from all of said weighing and collecting means except said one weighing and collecting means, and means for discharging said one weighing and collecting means every Nth cycle.

8. A method for controlling the discharge of material from a plurality of spaced weighing and collecting means cyclically fed with a respective predetermined amount of material to be discharged, wherein at least one of said weighing and collecting means is incapable of handling a particular amount of material but is capable of handling N times that amount of material, comprising of the following steps:

discharging all of said collecting and weighing means when a predetermined amount of material has accumulated in each of said weighing and collecting means, but preventing the discharge from said one weighing and collecting means, and discharging said one weighing and collecting means every Nth cycle.

9. A method as in claim 8, including the step of selecting the number of collecting means which are to be discharged during said Nth cycle.

10. Apparatus for controlling the discharge of material from collecting means wherein said discharge is dependent upon the accumulated weight of the material received by said collecting means, comprising:

a plurality of cyclically fillable and dischargeable material collecting means each of said means having a dump valve associated therewith, weighing means respectively associated with said collecting means for determining during filling thereof when a respective weight of material has been accumulated, one of said weighing means being incapable of weighing a desired amount of material but being capable of weighing N times that amount which is its said respective weight, a plurality of first control circuits connected to each one of said dump valves for controlling the dumping of the contents of said collecting means when said dump valves are activated, at least one of said first control circuits having a switch means for activating the circuit on every Nth cycle and interrupting the circuit on each intervening cycle, and a plurality of second control circuits associated with each one of said weighing means for electrically determining during the filling of said weighing means when a predetermined weight of material has been reached, at least one of said second control circuits having a switch means for activating said circuit on every Nth cycle and interrupting the circuit on each intervening cycle.

11. Apparatus as in claim 10 wherein said switch means in said first and second control circuit are contact switches of a stepping relay.

12. Apparatus as in claim 10 including respective second switch means connected in parallel to the said switch means in said first and second control circuits for activating both said control circuits when the first mentioned switch means thereof are open.

13. An apparatus for controlling the discharge of material from collecting means wherein said discharge is dependent upon the accumulated weight of the material received by said collecting means, comprising:

a plurality of cyclically fillable and dischargeable material collecting means, each of said means having a dump valve associated therewith, weighing means respectively associated with said collecting means for determining during filling thereof when a respective weight of material has been accumulated, one of said weighing means being incapable of weighing a desired amount of material but being capable of weighing N times that amount which is its said respective weight, wherein N is greater than one, a plurality of first control circuits connected to each one of said dump valves for controlling the dumping of the contents of said collecting means when said dump valves are activated, each of said first control circuits having a respective first switch means for determining whether its control circuit is to be activated every cycle or only on every Nth cycle, a plurality of second control circuits associated with each of said weighing means for electrically determining during the filling of said weighing means when a predetermined weight of material has been reached, each of said second control circuits having a respective second switch means for determining whether its control circuit is to be activated every cycle or only on every Nth cycle.

14. Apparatus as in claim 13 including means for closing said first and second control circuits only every Nth cycle and means for effectively bypassing said closing means to cause said first and second control circuits to be activated every cycle when desired.

15. Apparatus for controlling the discharge of material from collecting means wherein said discharge is dependent upon the accumulated weight of the material received by said collecting means, comprising:

a plurality of cyclically fillable and dischargeable material collecting means, weighing means respectively associated with said collecting means for determining during filling thereof when a respective weight of material has been accumulated, one of said weighing means being incapable of weighing a desired amount of material but being capable of weighing N times that amount which is its said respective weight, means for discharging, once each cycle, each of said collecting means except at least one every Nth cycle, said one collecting means being respectively associated with said one weighing means, and multiple selection means for determining which collecting means are to be discharged during the Nth discharge cycle.

16. An apparatus as in claim 15 wherein said selection means includes a stepping relay for preventing discharge of said one collecting means until said Nth discharge cycle.

17. For use with material blending equipment which includes a plurality of spaced weighing and collecting means cyclically fed with a respective predetermined amount of material to be discharged wherein at least one of said weighing and collecting means is incapable of handling a particular amount of material but is capable of handling N times that amount of material, the improvement comprising:

means operative at each cycle to discharge the said predetermined amount of material from all of said weighing and collecting means except said one weighing and collecting means, means for discharging said one weighing and collecting means every Nth cycle, and multiple selection means for determining which of said collecting and weighing means are to be discharged during said Nth cycle.

18. A method for controlling the discharge of material from a plurality of spaced weighing and collecting means cyclically fed with a respective predetermined amount of material to be discharged, wherein at least one of said weighing and collecting means is incapable of handling a particular amount of material but is capable of handling N times that amount of material, comprised of the following steps:

discharging all of said collecting and weighing means when a predetermined amount of material has been accumulated in each of said weighing and collecting means, but preventing the discharge from said one weighing and collecting means, discharging said one weighing and collecting means every Nth cycle, moving the discharged material below said weighing and collecting means, and causing said discharged material from said weighing and collecting means which are discharged every cycle to be overlapped by 1/Nth their length.

19. Apparatus for controlling the filling and discharge of material into and out of each of a plurality of collecting means wherein the amount of material fed into each said collecting means and subsequently discharged is a function of a measurable characteristic of the material, comprising:

a plurality of collecting means, measuring means associated with each collecting means for determining when said characteristic has a predetermined value, means for preventing further material from being fed into each collecting means after the measuring means associated with that collecting means determines said characteristic of material in that collecting means has a predetermined value, means for discharging said material in said collecting means, and means for causing at least one of said collecting means to discharge at a frequency which is a function of the frequency of discharge of another of said collecting means.

20. Apparatus as in claim 19 wherein said material is textile fibers.

21. Apparatus as in claim 19 wherein said characteristic is weight.

22. Apparatus as in claim 19 including at least three collecting means.

23. Apparatus as in claim 19 including means connected to said causing means for changing said function so that the frequency of discharge of said one collecting means is changed.

24. Apparatus as in claim 23 wherein said one collecting means discharges at about the same time as said another collecting means.

25. Apparatus as in claim 19 including selecting means for choosing the amount of mateiral to be fed into each collecting means.

26. Apparatus for controlling the filling and discharge of material into and out of each of a plurality of collecting means wherein the amount of material fed into each said collecting means is a function of a measurable characteristic of the material, comprising:

a plurality of collecting means, measuring means associated with each collecting means for determining when said characteristic has a given value, means for discharging the material in each said collecting means when said measuring means determines said characteristic has said given value, and switching means connected to said discharging means having a first state for causing all of said collecting means to discharge at about the same time when all of said measuring means have determined said characteristic has a given value and a second state for causing some of said collecting means to discharge at about the same time when all of said measuring means have determined said characteristic has a given value and at least one of the remainder of said collecting means to discharge at a frequency which is a function of the frequency of discharge of said some collecting means, said one collecting means discharging at about the same time as said some collecting means and not discharging each time said some collecting means discharges.

27. Apparatus for controlling the filling and discharge of material into and out of a plurality of collecting means wherein the amount of material fed into each said collecting means and subsequently discharged is a function of a measurable characteristic of the material, comprising:

a plurality of collecting means, means associated with each collecting means for choosing the amount of material to be fed into that collecting means, measuring means associated with said collecting means for determining when said characteristic has a given value indicating the chosen amount of material is contained in that collecting means, means for discharging said material in said collecting means, and means for causing at least one of said collecting means to discharge at a frequency which is a function of the frequency of discharge of another of said collecting means.

28. Apparatus for controlling the discharge of material from each of a plurality of collecting means wherein said each discharge is dependent upon a measurable characteristic of the material, comprising:

a plurality of fillable and dischargeable material collecting means, respective measuring means for said collecting means for determining during filling thereof when said material characteristic has a predetermined value, means for discharging said collecting means during respective cycles, and switching means connected to said discharging means having a first state for causing all of said discharging means to operate approximately at the same time and a second state for causing at least one of said discharging means not to discharge during some of said cycles.

29. A method for controlling the filling and discharge of material into and from a plurality of collecting means wherein the amount of material fed into each collecting means and subsequently discharged is a function of a measurable characteristic of the material and wherein at least one of said collecting means is incapable of handling a particular amount of material but is capable of handling N times that amount of material, comprising the following steps:

filling each of said collecting means until each said collecting means contains a predetermined amount of material, discharging some of said collecting means at the same time, when all of said collecting means contain said predetermined amount of material, and discharging said one collecting means every Nth time said some collecting means discharge.

30. A method as in claim 29 including the step of selecting the collecting means to be discharged every Nth time.

31. A method as in claim 29 including the step of selecting N from a plurality of integer numbers.

32. A method as in claim 29 including the step of preventing further feeding of said material into any collecting means after that collecting means contains said predetermined amount of material until that collecting means discharges.

References Cited

FOREIGN PATENTS 606,571 6/1926 France.
254,287 12/1948 Switzerland.

SAMUEL F. COLEMAN, *Primary Examiner.*

H. S. LANE, *Assistant Examiner.*

U.S. Cl. X.R.

222—134